US010850626B2

(12) United States Patent
Kemker et al.

(10) Patent No.: US 10,850,626 B2
(45) Date of Patent: Dec. 1, 2020

(54) SUPPLY OF A TROLLEY CHAIN WITH ELECTRICITY

(71) Applicant: BEUMER Group GmbH & Co. KG, Beckum (DE)

(72) Inventors: Winfried Kemker, Everswinkel (DE); Martin Sliwka, Ennigerloh (DE); Marc Hilgenstock, Fröndenberg/Ruhr (DE)

(73) Assignee: BEUMER Group GmbH & Co. KG, Beckumm (DE)

( * ) Notice: Subject to any disclaimer, the term of this patent is extended or adjusted under 35 U.S.C. 154(b) by 293 days.

(21) Appl. No.: 16/020,682

(22) Filed: Jun. 27, 2018

(65) Prior Publication Data

US 2019/0023284 A1 Jan. 24, 2019

(30) Foreign Application Priority Data

Jul. 21, 2017 (EP) .................................. 17182577

(51) Int. Cl.
| | | |
|---|---|---|
| B60L 53/12 | (2019.01) | |
| B60L 5/00 | (2006.01) | |
| B60M 1/13 | (2006.01) | |
| B60M 1/20 | (2006.01) | |
| B60M 1/30 | (2006.01) | |
| B61B 10/02 | (2006.01) | |
| B65G 17/18 | (2006.01) | |

(52) U.S. Cl.
CPC ............... B60L 53/12 (2019.02); B60L 5/005 (2013.01); B60M 1/13 (2013.01); B60M 1/20 (2013.01); B60M 1/307 (2013.01); B61B 10/022 (2013.01); B65G 17/18 (2013.01)

(58) Field of Classification Search
CPC .......... B60L 53/12; B60L 5/005; B60L 53/38; B60L 5/39; B60M 1/13; B60M 1/20; B60M 1/307; B61B 10/022; B65G 17/18; H02J 50/10; H02J 5/005
USPC ................................. 191/45 A, 10; 335/299
See application file for complete search history.

(56) References Cited

U.S. PATENT DOCUMENTS 6,089,512 A * 7/2000 Ansorge ................... B60L 5/005
246/194

FOREIGN PATENT DOCUMENTS

| EP | 2921431 | 9/2015 | |
|---|---|---|---|
| WO | WO-0021351 A2 * | 4/2000 | ............. B60L 5/005 |

* cited by examiner

*Primary Examiner* — Mark T Le
(74) *Attorney, Agent, or Firm* — Ganz Pollard, LLC (57) ABSTRACT

A system for supplying power to a trolley chain. The system includes: a trolley chain, consisting of at least two trollies coupled with one another, wherein the trolley chain has a closed bus; and a stationary energy conductor along the track of the trolley chain. The stationary energy conductor consists of one or more successive segments, which are spaced apart from each other. The closed bus has several transmission heads, which are designed to supply the closed bus with electricity from the stationary energy conductor without contacting the stationary energy conductor, if they are within a pre-determined distance to the stationary energy conductor. During a journey of the trolley chain along the track, at each moment in time, at least one of the transmission heads supplies the closed bus with electricity from the stationary energy conductor.

20 Claims, 7 Drawing Sheets

SUPPLY OF A TROLLEY CHAIN WITH ELECTRICITY

BACKGROUND

The present patent application relates to a system for supplying a trolley chain with electricity.

Trolley chains are trollies coupled with one another, which for example can transport rail-bound piece goods such as packages, suitcases or containers. Instead of a rail connection a trolley chain can also move on another soundly defined track. Forward movement is ensured through stationary drive motors or drive motors in the trollies. Load receiving means, which are driven by motors, are arranged on the trolley. Power to the drive motors is supplied by an external energy source.

The trolley chains are preferably used to transport piece goods or other merchandise. In particular corresponding trolley chains are used in sorting devices and other equipment with logistical applications.

EP 2 921 431 B1 discloses a trolley chain, which moves on rails and is equipped with drive motors. Power is supplied by sliding contacts or also by inductive contactless transmission between the trollies and a bus bar arranged outside of the trollies.

The object of the present invention is to ensure a continuous and stable power supply to the trolley chain.

SUMMARY

A first embodiment of the invention concerns a system for supplying power to a trolley chain, comprising: a trolley chain, consisting of at least two trollies coupled with one another, wherein the trolley chain has a closed bus; and a stationary energy conductor along the track of the trolley chain, wherein the stationary energy conductor consists of one or more successive segments, which are spaced apart from each other; wherein the closed bus has several transmission heads, which are designed to supply the closed bus with electricity from the stationary energy conductor without contacting the stationary energy conductor, if they are within a pre-determined distance to the stationary energy conductor; and wherein during a journey of the trolley chain along the track at each moment in time at least one of the transmission heads supplies the closed bus with electricity from the stationary energy conductor.

In accordance with a preferred embodiment, during the journey of the trolley chain all the transmission heads connected in each case to the stationary energy conductor by way of energy transmission generate constant DC voltage for the closed bus.

In particular the transmission heads can be connected in parallel with one another.

Preferably electricity is transmitted between the stationary energy conductor and the transmission heads by way of induction.

In certain embodiments at least one curve or one straight section does not contain any track segments of the stationary energy conductor.

Furthermore there are other embodiments wherein the closed bus extends over all the trollies of the trolley chain.

In accordance with a special embodiment, the system also comprises one or more consumers, that are arranged on the trollies and connected to the closed bus.

In particular the consumers can have motors to drive the trolley chain and/or the load-receiving elements to receive piece goods.

The stationary energy conductors can have an inner conductor and an outer conductor arranged in parallel to the inner conductor.

The transmission heads can have two pick up braids arranged parallel to each other. The pick-up braids preferably can be arranged between two legs of the outer conductor and the inner conductor of the stationary energy conductor to engage with the stationary energy conductor in each case. The stationary energy conductor and the pick-up braids do not touch.

Preferably at least one trolley of a trolley chain has no transmission head.

At least one trolley of the trolley chain can have no consumers.

In a preferred embodiment the consumers of the bus do not have drive units for the trolley chains, i.e. the trolley chains are driven independently of the power supply system described.

Alternatively, the drive units for the trolley chain can also be connected to the bus as consumers. At least one trolley of the trolley chain can have no drive units.

The combination of a stationary energy conductor, which consists of segments spaced apart from each other along the track of the trolley chain, and several transmission heads on the trolley chain is particularly advantageous, wherein due to the arrangement of the transmission heads during the journey at least one of the transmission heads constantly makes inductive contact with the stationary energy conductor. As a result, the invention minimizes the number of necessary transmission heads and the number or length of the segments which form the stationary energy conductor. At the same time the invention ensures a continuous power supply to the trolley chain. The number of transmission heads, which supply the trolley chain with electricity, can constantly change during the journey, as the supply from transmission heads, which are temporarily disconnected from one of the segments, is taken over by other transmission heads, which are meanwhile connected to a segment. As further advantage offered by this development, complex and thus costly bending of shaped parts to construct curves (horizontal/vertical) can be avoided by the invention, since with the stationary power supply system curves now no longer need to be constructed. Furthermore, potential savings arise as a result of eliminating collision inspections, which otherwise would be necessary if curves had to be constructed.

DETAILED DESCRIPTION

Trolley chains, consisting of at least two trollies coupled with one another, can however also have hundreds or thousands of trollies in large systems. A track can be constituted by a rail, on which the trollies move. A stationary energy conductor, here also designated as primary conductor, runs along the track. The primary conductor can supply alternating current for example and consists of at least one segment, which does not extend over the entire route. In some embodiments these segments are only provided on straight sections of the track. The segments are preferably straight. The segments can have identical length or alternatively different lengths. In certain embodiments the segments consist of an outer conductor and an inner conductor. The outer conductor preferably consists of aluminum, the inner conductor of individually insulated copper braids.

The trollies commonly have a closed bus, here also designated as secondary conductor. Preferably this concerns a power bus, which works with direct current. One or several transmission heads, here also designated pick ups, which are arranged on the trollies and which supply the secondary conductor with electricity from the primary conductor, are connected to the bus. Here the electricity can be transformed via the transmission heads, for example from AC to DC. The transmission heads are preferably uniform. The electricity is supplied via the closed power bus to each trolley and serves to supply the drive motors of the trolley chain and/or the load-receiving elements, which are arranged on some or even all the trollies. The distances between the segments of the primary conductor, the number of these segments, the number of transmission heads on the trolley chain as well as the distances between these transmission heads can be selected arbitrarily. In a special embodiment these parameters are co-ordinated so that the trolley chain constantly with at least one of the transmission heads makes inductive contact with one of the segments of the primary conductor during the journey along the route. The transmission head constantly in contact with the primary conductor can vary due to a transmission head losing contact with a segment when moving past and at the latest starting from this loss of contact at least one other transmission head makes inductive contact with one of the segments.

Embodiments of the invention preferably concern contactless transmission of electricity from the primary conductor to the secondary conductor, for example contactless transmission by way of induction. References to "contact" between primary conductor and transmission head expressly also include such contactless contacts.

The transmission heads constantly in contact with the primary conductor are connected in parallel with the secondary conductor. In a preferred embodiment the transmission heads convert the continuous supply voltage to an ideal voltage for the closed bus. This ideal voltage is constant and thus independent of the varying number of transmission heads, that are in contact with the primary conductor.

Figure 1A:
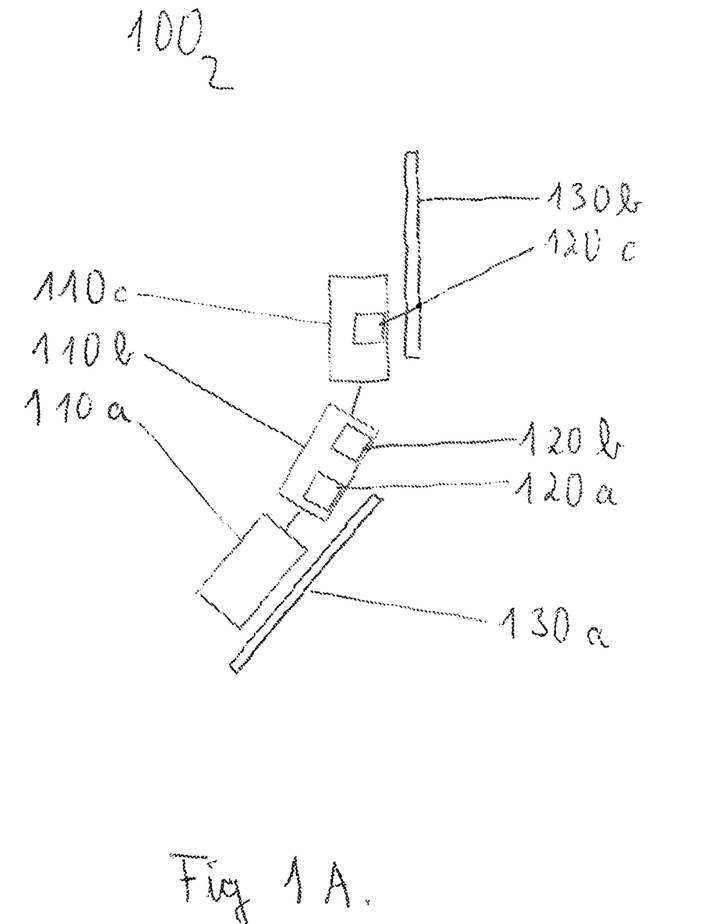
FIG. 1a shows a system in accordance with embodiments of the invention.

FIG. 1A shows by way of example a system according to the invention 100 to supply power to a trolley chain 110. The system 100 is shown in a view from above. The exemplary trolley chain consists of three trollies 110a, 110b, 110c, which are coupled with one another and move along a track. This track is suggested by a primary conductor, that consists of two exemplary segments 130a and 130b. The segments 130a and 130b are spaced apart from each other. Trolley 110c has a transmission head 120c, which is within a pre-determined distance to the segment 130b of the primary conductor 130 and therefore makes contactless contact to transmit electricity from the segment 130b to the trolley 110c. Trolley 110b has two transmission heads 120a and 120b, only transmission head 120a of which makes contact with the primary conductor. Contact is made by the segment 130a. Trolley 110a has no transmission head. The system 100 shown in FIG. 1A comprises a parallel connection consisting of the transmission heads 120a and 120c in this arrangement. On the driving side of the trolley the parallel connection comprises a bus (not shown). FIG. 1 is exemplary, at least insofar as the number of trollies, the number and distribution of the transmission heads as well as their contact with segments of the primary conductor can vary.

Figure 1B:
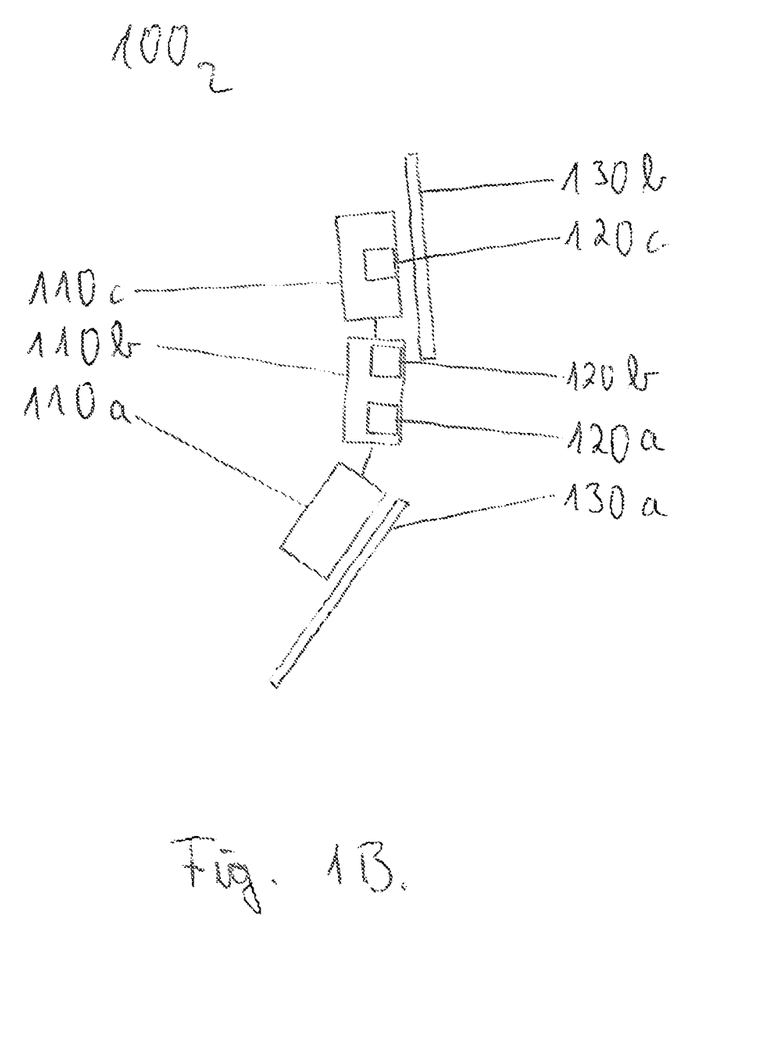
FIG. 1b shows the system of FIG. 1a with changed position of a trolley chain.

FIG. 1B shows the system 100 from FIG. 1A, according to which the trolley chain 110 has covered a section of the track. The transmission head 120c is also in contact with the segment 130b. The transmission head 120b of the trolley 110b is now in contact with the segment 130b, while the transmission head 120a is no longer in contact with the primary conductor. Thus, the system 100 comprises transmission heads 120c and 120b connected in parallel.

Figure 1C:
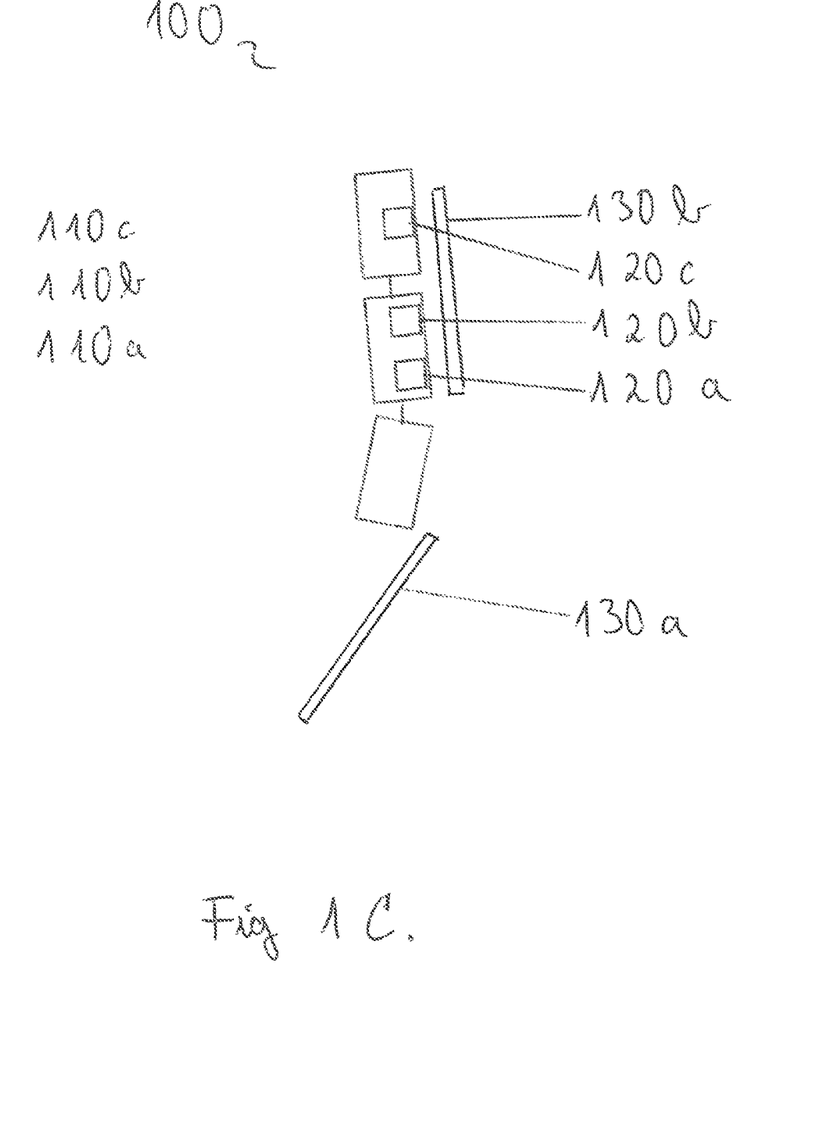
FIG. 1c shows the system of FIGS. 1a and 1b with a further changed position of the trolley chain.

FIG. 1C shows the system 100, according to which the trolley chain 110 has covered a further section of the track. All transmission heads 120a, 120b and 120c are now in contact with the segment 130b of the primary conductor.

Figure 2:
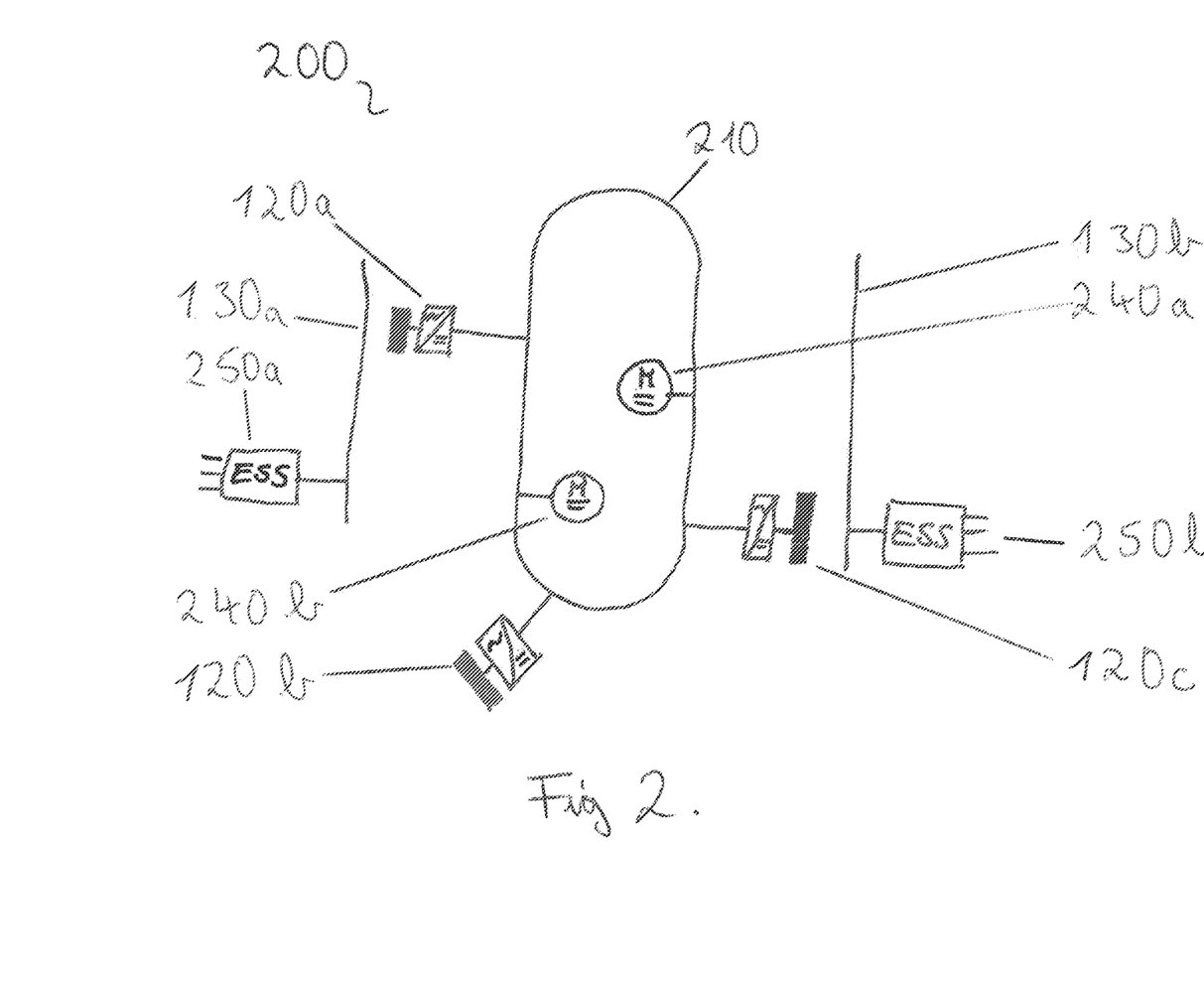
FIG. 2 shows a block diagram of a trolley chain in accordance with embodiments of the invention.

FIG. 2 shows an exemplary block diagram 200 of the invention. Two exemplary consumers 240a and 240b e.g. drive motors are connected to the closed bus 210. Furthermore, exemplary transmission heads 120a, 120b and 120c are shown. Each of the transmission heads 120a, 120b, 120c has an inductive energy coupler and on the one hand is connected to the closed bus 210, on the other hand to segments 130a and 130b of a primary conductor, provided one of the segments 130a and 130b lies within a pre-determined distance to the respective transmission head. Each of the segments 130a and 130b is shown with a respective source of power 250a or 250b. The sources of power 250a, 250b are also called power connectors.

In the arrangement shown a contact, for example a contactless contact, is arranged between transmission head 120a and segment 130a as well as transmission head 120c and segment 130b. The transmission head 120b however in FIG. 2 is only electrically connected to the secondary conductor.

Figure 3:
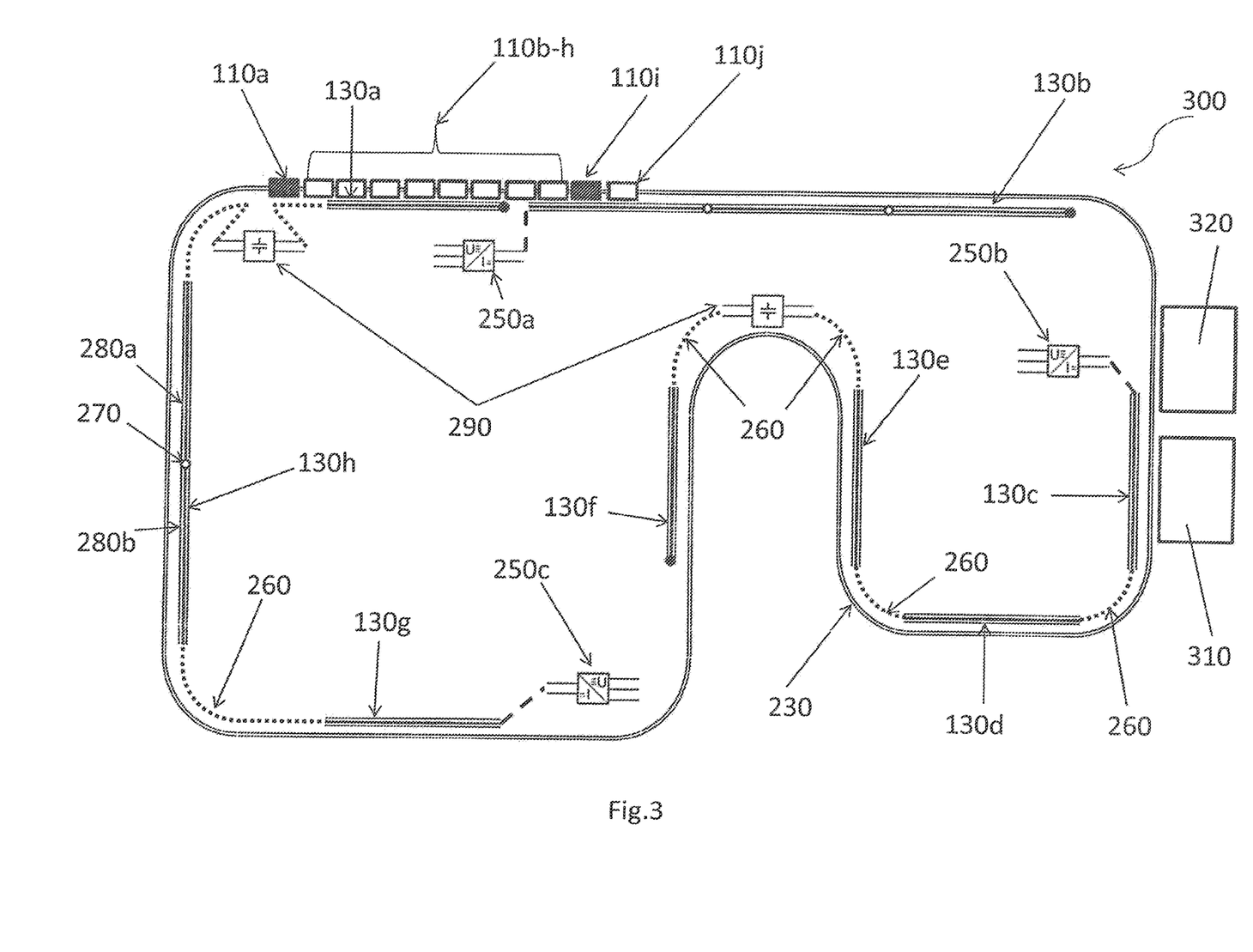
FIG. 3 shows an embodiment according to the invention of a sorting device.

FIG. 3 shows an embodiment of an inventive sorting device 300. A trolley chain 110 consisting of the trollies 110a to 110j can move on a track 230. In the illustrated case, the track 230 is constituted by a rail system. A loading station 310 and an unloading station 320 are provided along the track 230. The positions of the loading station and the unloading station should be regarded as exemplary. In reality loading and unloading stations 310, 320 are usually spaced far apart from each other. In particular normally several loading stations 310 and/or several unloading stations 320 are provided along the track 230. Two of the trollies 110a and 110i have transmission heads 120 to transmit electric power from the primary conductor 130 to a secondary conductor 210. In this case the transmission heads 120 are supplied by five primary conductor segments 130a, 130b, 130c, 130d, 130e, 130f, 130g and 130h. The individual primary conductor segments 130a to h are spaced apart from each other in each case. The number of segments should be understood here by way of example. In reality this depends on how long a track and/or track network 230 is, how long the trolley chains 110 moving on it are and/or how many trollies 110a to j of the trolley chain have transmission heads 120, how many curves the track 230 has, how flexibly the system should be used and/or what power should be able to be transmitted to the trolley chains 110. The primary conductor segments 130a to h for their part in the present example are supplied by sources of power/transformers 250a, 250b and 250c. Transformers 250, 250a, 250b, 250c, which convert a usual mains voltage (e.g. a three-phase, high frequency alternating voltage) into a two-phase, average frequency alternating current, are illustrated by way of example. However other transformers 250a, 250b and 250c, which adapt the current and voltage of an existing power network in each case to the desired power network of the primary conductors 130 are also conceivable. The primary conductor segments 130a to h, spaced apart from each other, can be connected to one another totally or partly via connecting conductors 260. Thus, several primary conductor segments 130a to h can be supplied with current via a transformer 250a to c. In order to avoid voltage surges due to impendance, compensation elements 290 can be provided. In the illustrated example a transformer 250b supplies the primary conductor segments 130c, 130d, 130e and 130f, connecting conductors 260 being provided between all primary conductor segments in each case. A compensation element 290, which eliminates voltage surges is also interposed between the primary conductor segments 130e and 130f. A primary conductor segment 130a to 130h can consist of several conductor modules 280a, 280b, wherein preferably only the outer conductor 420 is modular, while the inner conductor 430 can be a continual/continuous braided conductor. In the illustrated case, the primary conductor segment 130h consists of the conductor modules 280a, 280b for example. The conductor modules 280a and 280b are connected as a result at an interconnection point 270. This structure permits the use of standardised conductor modules, which each possess the same length and thus as standard parts are advantageous to purchase and/or to produce.

Also, in the embodiment of the invention illustrated in FIG. 3 the primary conductor segments 130a to h are straight conductor sections. The curves along the tracks are bridged as illustrated either by gaps or connecting conductor 260. In this case a gap signifies that before the curve a primary conductor segment 130a to h ends and after the curve a primary conductor segment 130a to h begins with a new source of power/transformer 250a to c. In the illustrated case, the transmission head 120 of the trolley 110i is in contactless connection with the primary conductor element 130b, i.e. the transmission head 120 at the illustrated point in time is substantially on the same level as the primary conductor element. The trollies 110b to h and 110j do not have transmission heads 120. The trolley 110a has a transmission head 120, at the illustrated point in time however this is not mentioned in connection with a segment of a primary conductor 130a to 130h. The trolley chain 110 is thus supplied with current at the illustrated point in time only via the transmission head of the trolley 110i. If the trolley chain 110 continues further in the clockwise direction, the transmission head of the trolley 110a with the primary conductor segment 130a would be in contact with the primary conductor segment 130a, so that both the transmission head of the trolley 110a and the transmission head of the trolley 110i would be in contact with a primary conductor segment.

Figure 4:
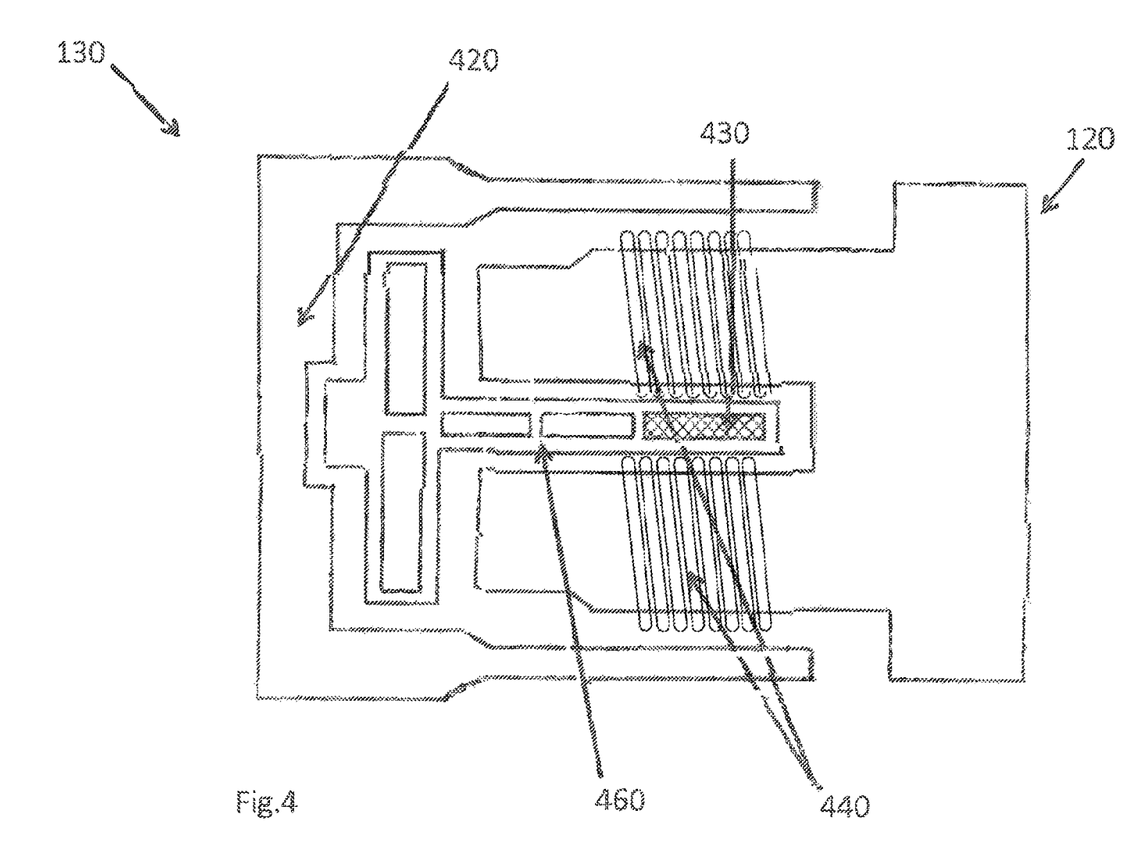
FIG. 4 shows an embodiment according to the invention of a transmission head of a trolley.

A preferred embodiment of the transmission heads 120 is illustrated in FIG. 4. In this embodiment the transmission head 120 has two pick up braids 440. The pick-up braids 440 run in parallel with each other away from a trolley. A primary conductor segment 130 which has an outer conductor 420 and an inner conductor 430 is illustrated opposite this. The inner conductor 430 preferably consists of a copper braid. This is held by a carrier 460. The outer conductor 420 is preferably made from aluminum. The outer conductor 420 can be substantially U-shaped and enclose the inner conductor 430 and the pick-up braids 440 on three sides. The carrier 460 of the inner conductor 430 as separate component can be detachably connected to the remaining segment of the primary conductor 130, it being possible that the carrier 460 is made from an insulating material. In this case, the pick-up braids 440 of the transmission head 120 protrude into two slots which are formed between the inner conductor 230/carrier 460 and the outer conductor 420 of the segment of the primary conductor 130.

Figure 5:
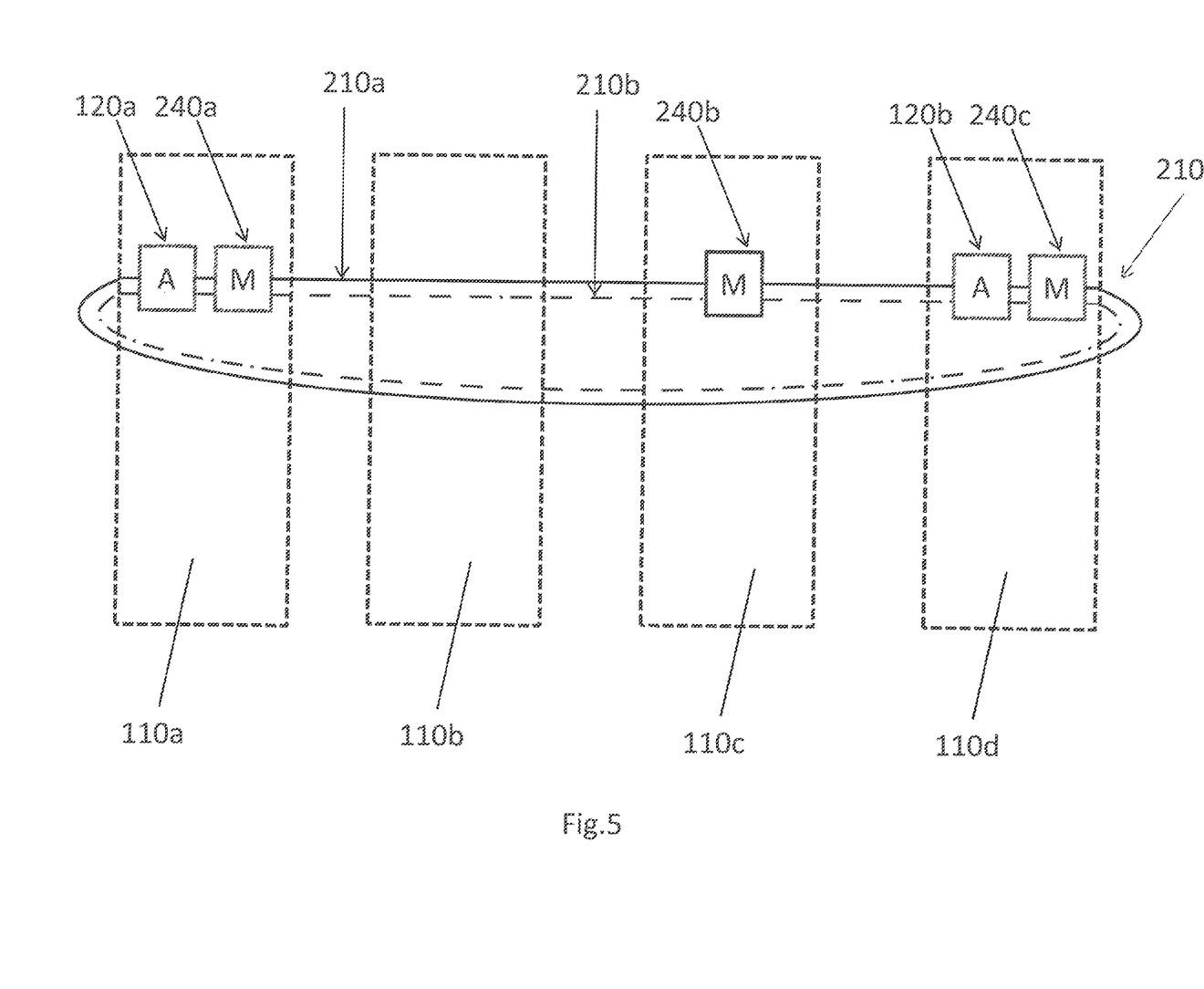
FIG. 5 shows an embodiment according to the invention of a closed bus in a trolley chain.

The transmission heads 120 of the trollies 110a to h in a preferred embodiment are connected to a bus/secondary conductor 210, as shown in FIG. 5. In the illustrated embodiment a trolley chain 110 consisting of four trollies 110a, 110b, 110c and 110d is shown. Two of the trollies 10a and 110d have a transmission head 120a, 120b. Three of the trollies 110a, 110c and 110d have a consumer 240a, 240b, 240c. As already described, not all the trollies 110a to 110d of a trolley chain 110 must have a transmission head 120 or a consumer. For each trolley chain it is necessary that a trolley 110a to 110d has a transmission head 120. Preferably at least two trollies 110a to 110d have a transmission head 120, so that sections of the track without segments of a primary conductor 130 can be bridged. In addition, at least one track is necessary for each trolley chain. In the illustrated embodiment the drive is implemented as a motor. It would also be conceivable here if only one of the trollies 110a to 110d has a motor/drive. The remaining trollies could be pulled/pushed by the trolley with a motor/drive unit. The consumers 240a, 240b can be drives of load-receiving elements (tilting trays or crossbelt drives). In a preferred embodiment the drives of the trollies 110a-j are not connected to the bus 210 as consumers 240a, 240b. In a further embodiment however, the drives of the trollies 110a-j are connected to the bus 210 as consumers 240a, 240b. All consumers 240a, b, c and the transmission heads 120 are connected to one another in a closed bus 210. The closed bus has two poles 210a and 210b. In the illustrated case 210a forms the positive pole and 210b the negative pole. The bus is preferably closed, i.e. both the positive pole 210a and the negative pole 210b form a closed circle. Thus, each trolley 110a-j is connected to two other trollies by two transmission conductors with positive poles and two transmission conductors with negative poles. Preferably the bus 210 is implemented as a so-called daisy chain.

The invention offers several advantages. Thus, the combination of segments of a primary conductor and transmission heads on a trolley chain permits weight savings for the trolley chain because every trolley does not need a transmission head. A further advantage is that in certain places of the track, at curves, primary conductors can be completely dispensed with. Thus, the necessity to install the primary conductor in such places is also eliminated which represents a substantial simplification in construction of the trolley chain and the track. The invention also substantially reduces the design effort for drives, particularly for primary conductors. In addition, the invention ensures a constant power supply to the closed bus on the trolley chain. The power supply is adapted to a constant level by inductive coupling of the transmission heads which are always active. Contrary to the prior art power levels, which are considerably higher than the nominal power of individual transmission heads is eliminated from the closed bus system, which clearly allows more margin of freedom in the design of equipment. Furthermore, the regular DC-voltage can be adapted much more easily to other voltage levels by step-up or step-down transformers, so that further special applications can be implemented. In particular financial savings can be made by partial equipping both on the stationary side (at minimum all curves are not supplied) and the mobile side (number of transmission heads can be considerably reduced). Another advantage is elimination of the restriction existing in the prior art concerning the maximum length of a primary segment.

Further advantages and embodiments are evident from the attached claims.

The invention claimed is:

1. A system for supplying a trolley chain with electricity, comprising:
    a trolley chain, comprising of at least two trollies coupled with one another, wherein the trolley chain includes a first end trolley and a second end trolley, each of which being directly coupled to only one trolley adjacent to it in the trolley chain, and wherein the trolley chain has a closed loop bus; and
    a stationary energy conductor along a track of the trolley chain, wherein the stationary energy conductor comprises of one or more successive segments, which are spaced apart from each other;
    wherein the closed loop bus has several transmission heads, which are designed to supply the closed loop bus with electricity from the stationary energy conductor without contacting the stationary energy conductor, if they are within a pre-determined distance to the stationary energy conductor; and
    wherein during a journey of the trolley chain along the track at each moment in time at least one of the transmission heads supplies the closed loop bus with electricity from the stationary energy conductor.

2. A system according to claim 1, wherein during the journey of the trolley chain all transmission heads connected to the stationary energy conductor by way of energy transmission generate constant DC voltage for the closed loop bus.

3. The system according to claim 1, wherein the transmission heads are connected in parallel with one another.

4. The system according to claim 1, wherein the electricity is transmitted between the stationary energy conductor and the transmission heads by way of induction.

5. The system according to claim 1, wherein at least one curve or one straight section of the track does not contain segments of the stationary energy conductor.

6. The system according to claim 1, wherein the closed loop bus extends over all the trollies of the trolley chain.

7. The system according to claim 1, further comprising one or more consumers, which are arranged on the trolley and connected to the closed loop bus.

8. The system according to claim 7, wherein the consumers comprise motors to drive the trolley chain and/or load-receiving elements to receive piece goods.

9. The system according to claim 1, wherein the stationary energy conductor has an inner conductor and an outer conductor arranged parallel to the inner conductor.

10. The system according to claim 1, wherein the transmission heads each comprise two pick up portions arranged parallel to each other, wherein the pick-up portions can be arranged between two legs of an outer conductor and an inner conductor of the stationary energy conductor to engage the stationary energy conductor respectively, wherein the stationary energy conductor and the pick-up portions do not touch.

11. The system according to claim 1, wherein at least one trolley of the trolley chain does not have a transmission head.

12. The system according to claim 7, wherein at least one trolley of the trolley chain does not have consumers.

13. The system according to claim 7, wherein the consumers of the closed loop bus do not comprise drive units for the trolley chains.

14. The system according to claim 7, wherein the consumers comprise drive units for the trolley chains, wherein at least one trolley of the trolley chain does not have a drive unit.

15. A sorting device, comprising a system for supplying a trolley chain with electricity, the system comprising:
    a trolley chain, comprising of at least two trollies coupled with one another, wherein the trolley chain includes a first end trolley and a second end trolley, each of which being directly coupled to only one trolley adjacent to it in the trolley chain, and wherein the trolley chain has a closed loop bus; and
    a stationary energy conductor along a track of the trolley chain, wherein the stationary energy conductor comprises of one or more successive segments, which are spaced apart from each other;
    wherein the closed loop bus has several transmission heads, which are designed to supply the closed loop bus with electricity from the stationary energy conductor without contacting the stationary energy conductor, if they are within a pre-determined distance to the stationary energy conductor;
    wherein during a journey of the trolley chain along the track at each moment in time at least one of the transmission heads supplies the closed loop bus with electricity from the stationary energy conductor, and
    wherein the sorting device has at least one loading station and one unloading station to load and/or unload the trollies of a trolley chain.

16. The sorting device according to claim 15, further comprising one or more consumers, which are arranged on the trolley and connected to the closed loop bus.

17. The sorting device according to claim 16, wherein at least one trolley of the trolley chain does not have a transmission head.

18. The sorting device according to claim 16, wherein at least one trolley of the trolley chain does not have consumers.

19. The sorting device according to claim 16, wherein the consumers of the closed loop bus do not comprise drive units for the trolley chains.

20. The sorting device according to claim 16, wherein the consumers comprise drive units for the trolley chains, and wherein at least one trolley of the trolley chain does not have a drive unit.

* * * * *